Sept. 13, 1966 C. V. JAKOWATZ 3,273,125
SELF-ADAPTING NEURON
Filed Aug. 22, 1961 2 Sheets-Sheet 1

Inventor:
Charles V. Jakowatz,
by John P. Dellitt
His Attorney.

Inventor:
Charles V. Jakowatz,
by John P. Dellatt
His Attorney.

United States Patent Office 3,273,125
Patented Sept. 13, 1966

3,273,125
SELF-ADAPTING NEURON

Charles V. Jakowatz, Schenectady, N.Y., assignor to General Electric Company, a corporation of New York Filed Aug. 22, 1961, Ser. No. 133,185
20 Claims. (Cl. 340—172.5)

The present invention relates to neuron-like self-adapting circuitry and particularly to such circuitry having the quality of remembering and classifying repeated events while being relatively insensitive to random events. This application is a continuation-in-part of my application Ser. No. 60,993, now abandoned, filed Oct. 6, 1960, entitled Self-Adapting Neuron and assigned to the assignee of the present application.

Neuron-like electrical networks have been proposed which are reportedly analogous in their operation to the operation of the human brain. Such networks involve neuron-like elements driving further neuron elements in an arrangement which may be initially random. The aim of the network is a self-organization or learning process so the network will come to consistently produce distinct outputs or resultants in response to different patterns of complex stimuli. As sets of stimuli repeatedly impinge upon the inputs of such a network, interconnecting paths tend to establish in response thereto so that different "events" represented by different sets of stimuli produce different and simplified outputs. After the learning period, the neuron-like network could, for example, become useful in solving character recognition problems and the like, or in other areas where adaptation from experience for producing some unique output is useful. Such a network may be said to exhibit memory properties of a sort, in that it should retain the capacity to produce a given resultant for given stimuli. This type of circuitry is possibly analogous to the human brain in that in the human brain synaptic junctions between a neuron and the dendritic branches leading from a previous neuron tend to alter physically, as theorized, to constitute a learning process.

Prior models of neuron nets have frequently functioned to alter the weighting or credit given to various input stimuli, including outputs from previous neurons, often in response to a forced learning program. The neuron elements come to accept or reject a set of stimuli based, for example, on their amplitude, without regard for any consistent quality of the stimuli. The neuron elements also remain responsive to some degree to stimuli other than the stimuli corresponding to a "learned" pattern, since the altered weighting employed is generally accomplished merely by altering input impedance. Therefore instabilities, ambiguities, and responses to random or noise stimuli tend to result.

It is therefore an object of the present invention to provide an improved neuron-type network for learning in response to stimuli wherein the network becomes less sensitive to random or irrevelant stimuli.

It is another object of this invention to provide an improved neuron-type device for producing an output, related to the consistency or similarity of inputs applied thereto.

It is another object of this invention to provide an improved neuron-type device having the property of stability through becoming selective of received input patterns.

It is another object of the present invention to provide an improved adaptive system which is based on a neural-like model.

In accordance with one aspect of the present invention as illustrated in an embodiment thereof, a plurality of parallel input stimuli establishes a function which is tested by a threshold. If such function exceeds the threshold, said threshold is increased so that a second plurality of input signals must produce a higher value before the threshold is exceeded. The output of the neuron is responsive to this threshold and to the exceeding of the threshold.

In accordance with another feature of the invention a plurality of neuron input stimuli are tested for similarity with prior inputs. Thus in one embodiment, a function of prior inputs is stored and new inputs are compared therewith. If a threshold degree of similarity is exceeded, storage is altered with the new inputs, and an output indication for application to other neurons, is produced or increased.

In accordance with one embodiment of the invention, new parallel inputs which compare favorably with storage are combined with stored values and the threshold of comparison is raised in response thereto while an output to other neurons is proportioned to the threshold value of comparison. It will be seen that a neuron according to the invention will make an increasing quality requirement upon input stimuli, or a requirement that new stimuli resemble a stored conception of previous "learned" stimuli, before an output or increased output is delivered by the neuron. Thus, consistent agreement produces an increased threshold of comparison and the increased threshold of comparison produces an increased output indicative of the quality of input signals as regards their similarity with memory. Irrelevant stimuli, i.e. not resembling recent memory, are disregarded by the neuron to an increased extent, while the neuron "learns" a repeated pattern.

In accordance with an additional feature of the invention, input stimuli are given weights influenced by the threshold value or output of the neuron.

According to another feature of the invention the output of a neuron as well as its input is a series of signals or stimuli whose frequency is proportional to the threshold of comparison.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figures 1, 2:
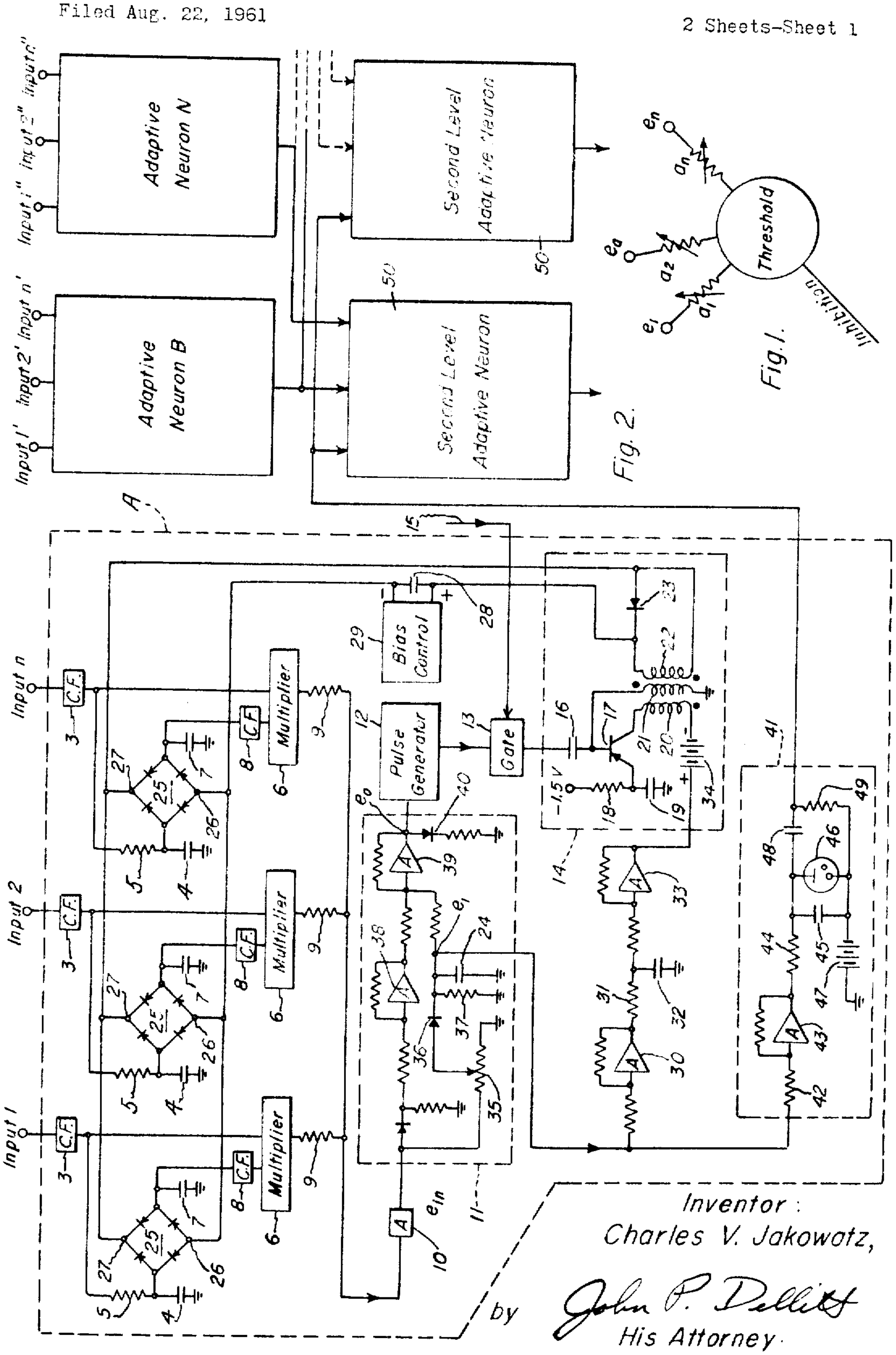
FIG. 1 illustrates the form of a neuron model.
FIG. 2 is a schematic diagram of self-adapting neuron circuitry according to the present invention.

In considering the brain as a mechanism many workers have postulated a model of a neutron as the principal building block. For example the work of Farley and Clark in "Simulation of Self-Organizing Systems by a Digital Computer," Transactions of the Institute of Radio Engineers' Professional Group on Information Theory, September 1954, discusses such a model. Briefly, a neuron can be considered to take the form of the model shown in FIG. 1. In FIG. 1 several input voltages, $e_1$, $e_2 \cdots e_n$, are modified by weighting factors $a_1$, $a_2 \cdots a_n$ in such a way that if $$\Sigma a_i \theta_i \geqq \theta$$

an output pulse will occur, provided the inhibition is not activated. That is, an output occurs if the summation of the input values as weighted exceeds a threshold value $\theta$. The weighting values may be changed if an output is produced. Any memory properties of this type of neuron must be ascribed, if at all, to the weights given each of the input stimuli.

The neuron embodiment of the instant invention presently to be described alters its threshold with experience and tests input stimuli in relation to values in stored memory, as garnered from previous input, for establishing a consistent operation while delivering an output indicative of its degree of confidence in such consistency. A basic unit in the combination of the present invention comprises an adaptive system similar to the adaptive filter described and claimed in my copending application, Ser. No. 7,276, filed Feb. 8, 1960, now Patent No. 3,114,884, assigned to the same assignee as the present invention.

Principles of the adaptive filter are incorporated to advantage in a neuron-type device. In an exemplary neuron-type device parallel inputs applied to an individual neuron are secured from other neurons and integrated. Each neuron then produces an output related to the quality of its own inputs.

Referring to the system shown in FIG. 2, a plurality of parallel inputs of a first adaptive neuron A, designated input 1, input 2 and input *n* are each applied through respective cathode follower circuits 3 to sampling capacitors 4. The output of each cathode follower is connected to the sampling capacitor 4 through input resistance 5. While the resistance 5 may normally be a part of a cathode follower circuit 3 it should be realized that each resistance-capacitance combination 4–5 has a time constant sufficiently large that the input signals are integrated over a finite period of time. The input signals will ordinarily comprise a series of pulses and the time constant of combination 4–5 should have a value near the average rate at which the input pulses occurs. Each input is also continuously applied to one input of multipliers 6. The second input to the multipliers 6 is supplied from storage capacitors 7, the output of storage capacitors 7 being coupled to the multipliers 6 through cathode follower circuits 8. The output of the multipliers which are proportional, respectively, to the products and the voltages appearing on input 1, input 2, and input *n*, and the voltages appearing on the corresponding storage capacitors 7 are connected together through resistors 9 so that a voltage indicative of the sum of the outputs is formed. Capacitors 7 are arranged to discharge more slowly than capacitors 4.

The common junction of resistors 9 is connected to a direct current amplifier 10. The output of this amplifier is positive for positive inputs to the multipliers and a function of the sum of the voltages appearing at the outputs of the multipliers 6. When a positive maximum occurs in this voltage it is an indication that the sum of the products of the voltages appearing at the sampling capacitors 4 and the voltages previously stored on the corresponding storage capacitors 7 is a maximum. This voltage is indicative of a high cross-correlation between the stored and sampled voltages.

While multipliers as shown in the embodiment facilitate comparison of the voltages on the respective storage and sampling capacitors, it should be appreciated that other types of comparison means may be utilized for this purpose.

The output of the amplifier 10 is supplied to a threshold detector indicated generally at 11, which in turn provides a keying voltage for pulse generator 12 whenever the output of the amplifier 10 reaches a voltage which exceeds a predetermined fraction of the previous peak output of amplifier 10. The pulse generator 12, receiving the voltage $e_0$ from threshold detector 11, includes a Schmitt trigger, the output of which goes positive when the voltage $e_0$ goes negative. The output of the Schmitt trigger does not return to the zero level until the voltage $e_0$ returns to zero. The output of the Schmitt trigger is differentiated and the negative values clipped therefrom. This output comprising a positive pulse is then applied through an inhibition gate 13 to a blocking oscillator 14 which in turn controls circuitry for coupling together respective capacitors 4 and 7 in response to the high degree of correlation. Inhibition gate 13 is a normally closed circuit which normally allows passage of the output from pulse generator 12. However, when an inhibition voltage is applied on inhibition input 15, the blocking oscillator 14 receives no input. Such a circuit can conveniently comprise a "normally closed" vacuum tube circuit which is normally conductive in the absence of an inhibition signal applied thereto as bias. This stage also inverts the output of pulse generator 12 so that a negative input will be applied to the blocking oscillator.

This pulse output fires blocking oscillator 14 through capacitor 16 coupled to the base of PNP transistor 17. The emitter of transistor 17 is connected to the midpoint of a voltage divider consisting of resistor 18 and capacitor 19 disposed in that order between a negative voltage and ground. The transistor will be biased in a normally non-conducting state. However, upon reception of a negative input from pulse generator 12 through gate 13, the base 17 is driven below the bias level causing the transistor 17 to conduct. The capacitor 19 charges towards the lower potential of the base through the emitter of transistor 17. The base current establishes a large collector current flowing through winding 20 of a three winding transformer comprising windings 20–22. A second winding 21, coupled to the transistor base, is oriented such that it is excited to produce a larger negative voltage on the base of the transistor to drive the transistor further into conduction. The process is cumulative until the transformer tends to saturate whereupon no greater flux change occurs therein as a greater collector current flows through the collector-connected winding of the transformer. At this time the potential of the transformer's base connected coil 21 drops below the more negative bias level which capacitor 19 has assumed, whereupon the transistor rapidly ceases to conduct. This blocking oscillator action produces a sharp pulse across output winding 22. A reverse polarity overshoot caused by flux reversal in the transformer is shunted by clipping diode 23.

The output from blocking oscillator 14 acts to couple the individual sampling capacitors 4 to the respective storage capacitors 7 so that the voltages on the two capacitors tend towards an equilibrium condition. This operation takes place each time a maximum occurs in correlation function and, in this way, an adjustment of the voltage on a storage capacitor 24 in threshold detector 11 is also effected. The theoretical manner in which a weighted averaging of the stored and sampled voltages is accomplished is explained in greater detail in my aforementioned copending application entitled Adaptive Filter, Serial No. 7,276, filed Feb. 8, 1960, now Patent No. 3,114,884, assigned to the assignee of the present invention. Switching or coupling circuits 25 which act to provide adjustable weighted averaging are set forth in greater detail in the copending application of Jack E. Taylor, entitled Variable Admittance Switching Device, Serial No. 104,646, filed Apr. 21, 1961 and assigned to the assignee of the present invention. It will be understood each such switching means may alternatively comprise a relay for connecting the storage and sampling capacitors under the control of pulse generator 12 as in my aforementioned application. However, the adjustable switching means 25 provide an electrically adjustable admittance and therefore an improved weighting function between the respective sampling and storage capacitors.

Each such switching means 25 comprises a diode-bridge having its input and output connections coupled respectively to a sampling capacitor 4 and a storage capacitor 7. Conjugate or control terminals 26 and 27 receive the output of blocking oscillator 14 through a capacitor 28 such that the output of blocking oscillator 14 is positive at terminal 26 with respect to terminal 27. The four bridge diodes are poled to carry a positive current from control terminal 26 to control terminal 27 whereby the diodes will all conduct in the presence of an output from pulse generator 12. As the diodes become conducting, a current is permitted to flow between each sampling capacitor 4 and its corresponding storage capacitor 7, tending towards a charge equilibrium for the capacitors.

In the absence of an output from blocking oscillator 14, a voltage from a bias control source 29 causes the diodes of the respective bridges 25 to become non-conducting, presenting a normally open circuit between the two capacitors. Then, an output from blocking oscillator 14 must overcome this bias control voltage to render the bridge circuit conducting again. The bias control voltage from bias control source 29 is adjustable to provide a variable D.C. opposition to the output of blocking oscillator 14. In this manner, the output pulses from blocking oscillator 14 will cause conduction through the diodes of bridges 25 on selectable portions of their non-linear forward admittance (current vs. voltage) characteristics. Such admittance has a relatively low value when the bridge diodes just barely conduct and greater admittance when they are driven further into conduction. The weighting which the input signal on sampling capacitors 4 receives when coupled to storage capacitors 7 through the bridge can then be electrically controlled.

The weighting the input signal on sampling capacitors 4 receives is likewise adjustable by means of altering the collector potential of transistor 17 in blocking oscillator 14. When this potential is varied, the magnitude of blocking oscillator output pulses are controllable in relation thereto. The magnitude or pulse height of the output pulses from winding 22 of the blocking oscillator 14 then also conveniently determines the admittance of bridge switching circuits 25 by determining a point of operation on their respective characteristic curves when they act to couple respective sampling capacitors 4 to storage capacitors 7.

In the illustrated embodiment the voltage $e_1$ on capacitor 24, indicative of the stored threshold value in threshold detector 11, is employed for controlling the collector voltage of blocking oscillator 14 and therefore for controlling the weighting which the voltage on sampling capacitor 4 receives when coupled to storage capacitor 7. For this purpose the voltage from capacitor 24 is connected to a first isolating amplifier 30, whose output is integrated by means of a resistor 31 connected to capacitor 32, the latter being shunted to ground. The integrated voltage is then applied through another isolating and inverting amplifier 33 to the positive side of a transistor collector voltage source 34, the negative side of which provides collector potential through winding 20. It will then be seen that as the threshold value on capacitor 24 rises, an increasing positive voltage will be added in series with collector supply 34, thereby reducing the collector voltage applied to the transistor to diminish the magnitude of its pulse output. In this way, as the threshold value $e_1$ increases, indicating higher correlation between values stored in the neuron and input values, the weighting which such input values receive when added to storage will decrease. This mode of operation is desirable so the stored values will become more nearly an average of "learned" input values when correlation is high.

The integrating circuit 31–32 between amplifiers 30 and 33 is included to provide a relatively slowly changing running average of the correlation value for application to blocking oscillator 14. The integrating circuit as shown may be substituted with a Miller-type circuit for example including amplifier 33.

Although altering the weighting produced by switching means 25 has been shown as accomplished through altering the collector potential in blocking oscillator 14, the same type of control can be secured by electronically varying in a similar manner the bias provided by source 29 so that negative bias increases with an increase in threshold voltage.

The adjustable weighting type of apparatus is set forth in greater detail and claimed in the aforementioned application of Jack E. Taylor.

Referring to the threshold detector 11 in FIG. 2, the output of amplifier 10 is designated $e_{in}$ is connected through variable resistor 35 and diode 36 to capacitor 24 in parallel with resistor 37, returned to ground, and charges capacitor 24 to a voltage designated as $e_1$, the threshold voltage. The voltage $e_1$ is always indicative of the previous maximum of the voltage $e_{in}$ because the diode 36 prevents discharge of capacitor 24. The voltage $e_1$ may correspond to the previous maximum of voltage $e_{in}$ or a predetermined fraction thereof depending upon the setting of the tap on resistor 35. As used in this application, including the claims thereof, "predetermined fraction" includes unity. The voltage $e_1$ is added to the inverted value of $e_{in}$ taken from inverting amplifier 38. The result of this addition is again inverted by the inverting amplifier 39 and the output of this amplifier 39, designated $e_0$, is connected to pulse generator 12. All positive values of the output of amplifier 39 are clipped by clipping diode 40.

The "firing" level of the threshold detector 11 and associated pulse generator 12 varies in accordance with threshold voltage which is stored on the capacitor 24. As the correlation between the voltages on storage capacitors 7 and sampling capacitors 4 becomes higher and higher, the magnitude of the threshold voltage on capacitor 24 increases. It is noted that input voltages received by the neuron tend to have a higher correlation with the corresponding voltages stored by the neuron (on capacitor 7) before the input voltages are combined with such stored voltages through switching means 25 a second time. Therefore, as agreement improves between inputs and stored values, a higher quality agreement is required of the inputs; that is their correlation with stored values must exceed a higher threshold. In this manner the neuron learns repeated patterns. This action also greatly contributes to the stability of the neuron in a network.

With increasing time the threshold voltage $e_1$ will decay. The purpose of this time weighting is to eventually bring the threshold down if there is not a similarity between the input voltages and the contents of storage. It is analagous to "forgetting." The time constant associated with capacior 24 and resistor 37 should be the same order of magnitude as the time constant of combination 4–5. Further details of specific threshold circuitry are more fully set forth in my previously referred to copending application.

The threshold voltage on the capacitor 24 is also connected to an output circuit generally designated at 41. The output circuit 41 is a pulse forming network which produces a train of pulses having a reptition rate such that the average rate of the pulses is high for a high threshold voltage and low for a low value of threshold voltage. The threshold voltage $e_1$ is connected through a resistor 42 and a D.C. amplifier 43 to a relaxation oscillator including a resistor 44, capacitor 45 and neon tube 46. The source of voltage 47 provides a power source for the relaxation oscillator.

It can be shown that the period of oscillation of the relaxation oscillator is given by $$T=R_{44}C_{45}\log\frac{e_1-V_2}{e_1-V_1}$$

where T is the period of oscillation, $R_{44}$ is the resistance of resistor 44, $C_{45}$ is the capacitance of capacitor 45, $e_1$ is the threshold voltage taken from the threshold detector, $V_2$ is the voltage across capacitor 45 after the tube 46 has been fired, and $V_1$ is the voltage at which the neon tube fires. Thus if $V_2$ and $V_1$ are fixed and $V_1$ is greater than $V_2$, it can be seen that the period of oscillation decreases with an increase in the threshold voltage $e_1$. That is, the repetition rate of the relaxation oscillator increases with increasing threshold voltage. Thus, the repetition rate of the pulses produced by the oscillator is a monotonic function of the threshold level. Capacitor 48 and resistor 49 are provided to differentiate the output of the relaxation oscillator and provide a pulse-like output.

Figure 3:
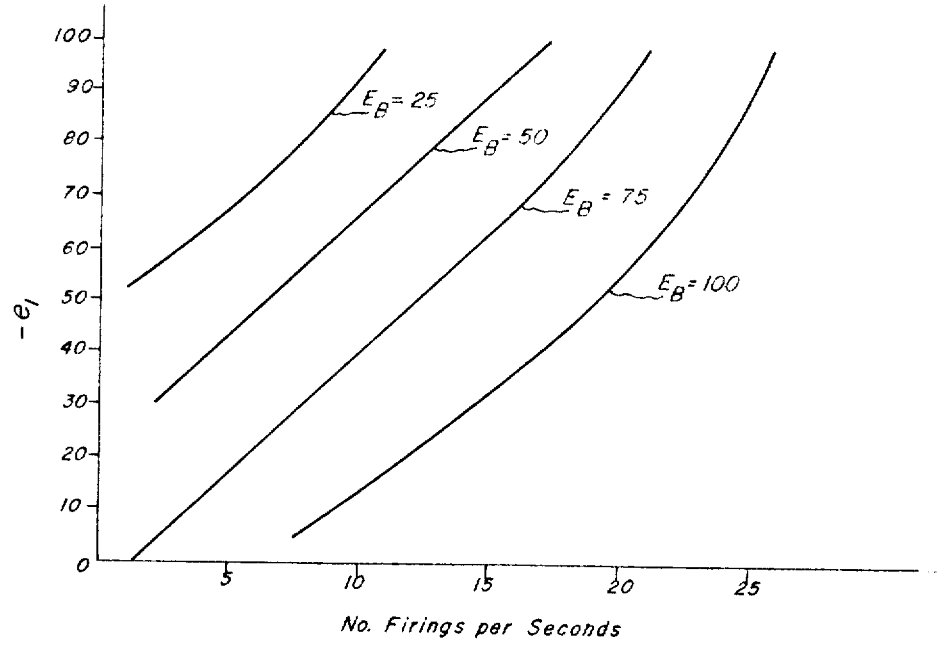
FIG. 3 is a graph plotting the number of firings per second of a relaxation oscillator employed in accordance with the present invention, as a function of threshold voltage in the self-adapting neuron.

Referring to FIG. 3, there are illustrated curves of firings per second for such a relaxation oscillator as a function of the input voltage for fixed values of the source of voltage 47 designated $E_B$. It can be seen when the source of voltage $E_B$ is a particular value, e.g., 75 volts, the rate of firing is almost a linear function of the threshold voltage $e_1$.

The operation of the adaptive neuron, for example neuron A of FIG. 1 can be explained briefly as follows: Pulse-like inputs applied to input 1, input 2 and input *n* are each integrated by the network including the input resistor 5 and the sampling capacitor 4. The voltage across the sampling capacitor 4 is a time average of the input voltage. A storage capacitor 7 is associated with each sampling capacitor 4 and a comparison is made between the voltages on the two capacitors. As shown in this embodiment multipliers 6 produce an output which is the product of the voltages on the sampling capacitors and the voltages on the associated storage capacitors 7. The outputs of the multipliers are added and connected to the input to the threshold detector 11. The threshold detector monitors the ouput of the comparison devices so as to reinforce incoming events or patterns which are similar to the events or patterns which are already stored in the storage capacitors 7 to accomplish the learning process. This is accomplished by providing the threshold detector which stores a threshold voltage which is a predetermined fraction of the previous peak input voltage to the threshold detector. Whenever the input to the threshold detector exceeds the threshold voltage, a pulse output is produced by the pulse generator 12 unless inhibited by gate 13. This pulse output actuates a plurality of switches 25 which momentarily couple each sampling capacitor 4 to its associated storage capacitor 7. This effects a weighted average of input voltages on the storage capacitors 7, the weighting being controlled by a weighting control circuit including blocking oscillators 14 and amplifiers 30 and 33, as an inverse function of the integrated threshold voltage.

The threshold voltage stored by the threshold detector varies in accordance with a stimulus strength and coincidence of the parallel inputs to the neuron as well as in accordance with similarity between present and past inputs. This threshold voltage is connected to an output circuit which furnishes a pulse output the frequency of which is proportional to the threshold voltage; that is, the stimulus strength of the output is proportional, inter alia, to the overall quality of the parallel inputs. When a coincidence or high correlation occurs between present and past events, the output frequency goes up and the degree of increase indicates degree of correlation between present and past events as well as the strength of stimuli comprising the present event.

The output of neuron A is supplied as an input stimulus to one or more second level adaptive neurons 50 which are the same in construction to the one disclosed. Likewise, another first level adaptive neuron B and an adaptive neuron N receive initial stimuli input and provide in like manner the input stimuli to one or more second level adaptive neurons. Inter-connections between first level adaptive neurons and second level adaptive neurons are made in varying, that is different, arbitrary combinations whose number may be dictated by the number of first layer and second layer adaptive neurons employed. It is understood that the number of first layer adaptive neurons, herein illustrated as three in number, may be determined by the number of input stimuli, and the number of input stimuli which may be received by each neuron. The latter, also conveniently shown as three for purposes of illustration, may be varied as determined by the number of input stimuli in any certain category. For example, the inputs to an individual adaptive neuron may come from sensors in a given small area or physically related sense area. The number of adaptive neurons in the second level should be comparable to the number in the first level and it is understood that as many levels may be employed as may be desirable for further simplification and categorization of the input data.

The neuron network described is useful in establishing a circuit configuration or configurations through the network in accordance with learned input patterns to produce an output less complex than the input stimuli. A limited example is a character recognition problem wherein the initial inputs to the first level adaptive neurons represent functions of photocell outputs on a photocell retina. Each of the inputs in a pattern applied to individual adaptive neurons is conveniently derived from separate small areas of the retina comprising a planar arrangement of photocells arranged to receive an overall light image. With a plurality of neuron layers, each having a sufficient number of neurons to handle a number of possible combinations related to the number of different connections to be recognized, output from the last level becomes simpler, until one separate, unique and materially larger or higher frequency output is indicative of each complex but unique combination of original input stimuli. The neuron network is capable of learning a prescribed number of arbitrary patterns which may be initially undetermined and unknown. The number of such arbitrary patterns can be limited if desired to the number of separate final output neurons.

A distinctly smaller number of cells or neurons are required for this type of network than if an expedient were followed of merely interconnecting inputs to outputs in all conceivable combinations. The present network will adapt itself to learning a signal and need not be forced-fed inasmuch as it may be said to be self-forcing.

While a character recognition problem is here described for convenience of illustration it must not be implied that character recognition is the only use for a neuron network. It is apparent that many other uses exist therefor in solving classification problems. What is set forth is an improved simulated neuron and neuron-type network with increased flexibility and having improved stability with rapid automatic learning characteristics.

In the illustrated embodiment of the present invention, inputs to the neurons in various levels are described as a series of pulses whose frequency increase as a function of activity, that is to indicate an increase in the input function. Each neuron is illustrated as including an oscillator for providing such an output signal and an integrating circuit for accepting such a signal as an input. This form of stimuli is effective in simulating the operation of real neurons and producing similar neural characteristics. However, the present invention, in its broader aspects, is not limited to this type of signal. The parallel inputs, for example, may comprise a single set of pulses per "event" which need not be integrated, avoiding use of resistors 5, if desired. An individual responsive output, responsive to a high correlation, could then be produced as more fully set out and particularly claimed in the copending application of Juris Hartmanis, Ser. No. 133,186, now Patent No. 3,103,648, entitled Adaptive Neuron Having Improved Output, and assigned to the same assignee as the present invention. In that instance, an output pulse is produced whose length is indicative of the degree of correlation between a new input pattern and that in storage (capacitors 7). Alternatively a pulse magnitude may be employed to indicate degree of correlation.

While a specific embodiment of my invention has been shown and described, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. An artificial neuron network comprising a plurality of simulated neurons including storage means, a plurality of input connections, comparison means for ascertaining the consistent similarity between electrical values in said storage means and values received upon said input connections to produce an output indicative of such similarity, means for combining with electrical values stored in said storage means a proportion of the electrical input values giving rise to an indication of similarity; and network circuitry coupling said output indicative of consistent similarity to input connections of other neurons.

2. Electrical circuitry comprising input connections, storage means, threshold means for detecting a degree of comparison between electrical values in said storage means and on said input connections exceeding a threshold value, means for varying said threshold value in response to favorable comparison, and means for producing an output wherein said output is a function of said threshold value.

3. An artificial neuron network comprising plural means for comparing input values applied thereto with prior input values applied thereto, a threshold means responsive to favorable comparison exceeding a threshold value for raising said threshold value at which a favorable comparison can occur, and means coupling a function indicating favorable comparison as an input to subsequent comparison means.

4. An artificial neuron comprising a plurality of input connections, means for weighting input values received upon said input connections, storage means associated with said input connections for storing electrical values indicative of prior input values received upon said input connections, means establishing a threshold value, means for comparing input values on said input connections with values stored by said storage means to determine when comparison thereof exceeds said threshold value, means for increasing said threshold value in response to relative match between input values and values stored by said storage means and for altering the weighting of said weighting means, and output means coupling a value indicative of favorable comparison to other such neurons.

5. An artificial neuron capable of receiving a plurality of inputs and for producing an increase in output of said neuron in response to a combination of inputs when a predetermined parameter of said combination reaches a threshold value comprising means for raising said threshold value when a plurality of inputs applied to said neuron are similar to prior applied inputs, and means for coupling the output of said neuron as an input to another such neuron.

6. An artificial neuron capable of receiving a plurality of inputs and for producing an increase in output of said neuron in response to a combination of inputs when a predetermined parameter of said combination reaches a threshold value comprising means for raising said threshold value when a plurality of inputs applied to said neurons are similar to prior applied inputs, means for weighting the inputs to said neurons in response to a change in threshold whereby said weighting decreases as said threshold increases, and means for coupling the output of said neuron for use as an input to another neuron.

7. An artificial neuron having at least one input comprising means for weighting said input, a storage means, comparison means for comparing storage with a non-weighted input, means for producing an output and inserting at least a portion of weighted input into said storage means in response to a favorable comparison between said non-weighted input and storage which exceeds a predetermined threshold value, means for adjusting said threshold value in response to the degree of match between said input and the value in storage and for similarly lowering the weighting of said weighting means, and means for providing an output which is indicative of a favorable comparison to a second such artificial neuron.

8. An artificial neuron for successively receiving a plurality of inputs comprising threshold means for establishing a threshold value, said threshold means being responsive to a correlation function of a first plurality of said inputs for producing an increase in the output of said neuron as said function exceeds said threshold value, means for raising said threshold value when said threshold value is exceeded so that the same function of a second plurality of inputs will tend to attain a higher value before said threshold is exceeded, and circuit means for coupling said output of said neuron as an input to another neuron.

9. An artificial neuron for successively receiving a plurality of inputs comprising means for weighting said inputs, threshold means for establishing a threshold value, said threshold means being responsive to a function of a first plurality of inputs for producing an increase in the output of said neuron as said function exceeds said threshold valve, means for raising said threshold valve when said threshold value is exceeded so that said function of a second plurality of inputs will attain a higher value before said threshold is exceeded, means for decreasing the weighting of said inputs as said threshold value increases, and circuit means for coupling said output of said neuron as an input to another neuron.

10. An artificial neuron comprising means for successively receiving a plurality of inputs, means for producing an output for coupling to other such neurons which increases in the value of a parameter thereof as a function of said inputs exceeds a threshold, and means for raising said threshold when a plurality of inputs is reinforced by a similar plurality of inputs so that the neuron becomes increasingly insensitive to non-similar inputs.

11. Self adaptive circuitry for producing an output having a stimulus strength which varies in accordance with the stimulus strength of a plurality of parallel input signals comprising a plurality of signal sampling means respectively disposed to receive said plurality of input signals, a plurality of signal storage means, comparison means for producing an output indicative of the correlation between respective values stored in said storage means and received upon said sampling means, a threshold establishing detector receiving the output of said comparison means for producing an output when said comparison reaches a peak being a predetermined fraction of a previous peak received by said threshold detector, means for coupling sampling means to respective storage means actuated by an output of said threshold detector, and output means for said self adaptive circuitry producing an output having a stimulus strength proportional to the threshold value established by said detector.

12. Self adaptive circuitry for producing an output having a repetition rate which varies in accordance with the repetition rate of a plurality of parallel input signals, said circuitry comprising means for integrating each of said parallel input signals, a plurality of storage means associated with respective integrating means, threshold means for establishing a threshold value, comparison means for ascertaining similarity between said integrated input signals and respective values stored by said storage means and for producing an output when said similarity exceeds said threshold value, means for combining with said values stored in said storage means other values which are a function of the integrated input signals giving rise to an indication of similarity, means for raising said threshold as said threshold value is exceeded by said comparison, and output means producing a pulse having a repetition rate proportional to the magnitude of said threshold value.

13. Self adaptive circuitry for producing an output having a repetition rate which varies in accordance with the repetition rate of a plurality of parallel input signals, said circuitry comprising means for integrating each of said parallel input signals, a plurality of storage means associated with respective integrating means, threshold means for establishing a threshold valve, comparison means for ascertaining similarity between said integrated input signals and respective values stored by said storage means and for producing an output when said similarity exceeds said threshold value, means for combining with said values stored in said storage means a function of the integrated input signals giving rise to an indication of similarity, means for raising said threshold when said threshold value is exceeded by said comparison, and output means producing a pulse having a repetition rate proportional to the magnitude of said threshold value, said output means including a relaxation oscillator responsive to said threshold value for controlling the time period of said relaxation oscillator.

14. Self adaptive circuitry for producing an output having a repetition rate which varies in accordance with the repetition rate of a plurality of parallel input signals, said circuitry comprising means for integrating each of said parallel input signals, a plurality of storage means associated with respective integrating means, threshold means for establishing a threshold value, comparison means for ascertaining similarity between said integrated input signals and respective values stored by said storage means and for producing an output when said similarity exceeds said threshold value, means for combining with said values stored in said storage means a function of the integrated input signals giving rise to an indication of similarity, means for raising said threshold when said threshold value is exceeded by said comparison, output means producing an output proportional to said threshold value, and a gating circuit for inhibiting the output of said threshold means in response to inhibition stimuli.

15. Self adaptive circuitry for producing an output having a repetition rate which varies in accordance with the repetition rates of a plurality of parallel input signals, said circuitry comprising means for integrating each of said input signals, a plurality of voltage sampling capacitors, each of said integrated input signals being connected to a corresponding one of said sampling capacitors, a plurality of voltage storage capacitors, means for connecting each of said sampling capacitors to a corresponding storage capacitor, correlation means for determining the correlation between the voltages on said storage capacitors and the voltages on the corresponding sampling capacitors, a threshold detector, said correlation means being connected to said threshold detector, said threshold detector producing an output only when the output of said correlation means reaches a peak which exceeds a threshold voltage indicative of a predetermined fraction of the previous peak input to said threshold detector, said threshold detector being connected to said means for connecting said sampling capacitors to said storage capacitors whereby each of said sampling capacitors is connected to a corresponding one of said storage capacitors only when said threshold detector produces an output, and output means, said threshold voltage being connected to said output means, said output means producing a pulse output having a repetition rate proportional to the magnitude of said threshold voltage.

16. An artificial neuron comprising plurality of parallel input connections, means for separately integrating the values received upon each of said input connections, storage means associated with said input connections for storing electrical values indicative of prior input values received upon said input connections, means establishing a threshold value, means for comparing integrated input values with the values stored by said storage means to determine when comparison thereof exceeds said threshold value, means for increasing said threshold value in response to relative match between said integrated input values and values stored by said storage means, and output means for providing a value indicative of favorable comparison, said output means producing a signal having a repetition rate proportional to the magnitude of said threshold value.

17. Self adaptive circuitry for producing an output having a repetition rate which varies in accordance with the repetition rate of a plurality of parallel input signals, said circuitry comprising means for integrating each of said parallel input signals, a plurality of storage means associated with respective integrating means, threshold means for establishing a threshold value, comparison means for ascertaining similarity between said integrated input signals and respective values stored by said storage means and for producing an output when said similarity exceeds said threshold value, means for combining with said values stored in said storage means a function of the integrated input signals giving rise to an indication of similarity, said combining means comprising a variable admittance switching means between respective means for integrating said input signals and corresponding storage means wherein the admittance of said switches is controlled by said threshold value so that the admittance of said switching means decreases with an increase in said threshold value, means for raising said threshold when said threshold value is exceeded by said comparison, and output means producing a signal having a repetition rate proportional to the magnitude of said threshold value.

18. An artificial neuron comprising input means for receiving input values, output means for producing an output indicative of the consistency of input values received by said input means, circuit means for coupling such output as an input value to another artificial neuron, and storage means for storing consistent input values.

19. An artificial nueron comprising input means for receiving input values, output means for producing an output whose frequency is indicative of the consistency of input values received by said input means, and circuit means for coupling such output as an input value to another artificial neuron.

20. An artificial neuron comprising input means for receiving input values, means for integrating said input values, and output means for producing an output whose frequency is indicative of the consistency of said input values.

References Cited by the Examiner

UNITED STATES PATENTS 3,103,648 9/1963 Hartmanis -------- 340—172.5

OTHER REFERENCES

Publication I: "A Variety of Intelligent Learning in a General Problem Solver," pp. 153–189, an article published by Newell, Shaw and Simon, May 6, 1959, and reproduced in Self Organizing Systems, by Yovits and Cameron, published 1960, by Pergamon Press.

Publication I: "Report on Bionics," Electronic Design, p. 40, Sept. 14, 1960.

ROBERT C. BAILEY, *Primary Examiner.*

MALCOLM A. MORRISON, *Examiner.*

P. L. BERGER, *Assistant Examiner.*